(12) United States Patent
Hoffmann et al.

(10) Patent No.: US 9,375,030 B2
(45) Date of Patent: Jun. 28, 2016

(54) METHOD FOR PRESERVING DRINKS

(75) Inventors: Manfred Hoffmann, Kempen (DE); Ingo Broda, Windeck (DE); Erasmus Vogl, Leverkusen (DE)

(73) Assignee: LANXESS Deutschland GmbH, Cologne (DE)

( * ) Notice: Subject to any disclaimer, the term of this patent is extended or adjusted under 35 U.S.C. 154(b) by 748 days.

(21) Appl. No.: 13/062,850

(22) PCT Filed: Sep. 21, 2009

(86) PCT No.: PCT/EP2009/062170
§ 371 (c)(1),
(2), (4) Date: Jul. 25, 2011

(87) PCT Pub. No.: WO2010/034678
PCT Pub. Date: Apr. 1, 2010

(65) Prior Publication Data
US 2012/0021117 A1    Jan. 26, 2012

(30) Foreign Application Priority Data
Sep. 24, 2008 (DE) .......................... 10 2008 048 714

(51) Int. Cl.
| A23L 3/3508 | (2006.01) |
| A23L 2/44 | (2006.01) |
| A23L 3/3463 | (2006.01) |
| A23L 3/3481 | (2006.01) |
| C12H 1/14 | (2006.01) |

(52) U.S. Cl.
CPC ................. *A23L 2/44* (2013.01); *A23L 3/3463* (2013.01); *A23L 3/3481* (2013.01); *A23L 3/3508* (2013.01); *C12H 1/14* (2013.01); *A23V 2002/00* (2013.01)

(58) Field of Classification Search
None
See application file for complete search history.

(56) References Cited

U.S. PATENT DOCUMENTS

| 3,936,269 | A | 2/1976 | Bayne |
| 5,866,182 | A * | 2/1999 | Exner et al. ................. 426/330.3 |
| 6,136,356 | A | 10/2000 | Bunger et al. |
| 6,562,387 | B2 * | 5/2003 | Kirby et al. ................. 426/330.3 |
| 7,258,883 | B2 | 8/2007 | Winniczuk |
| 2004/0234662 | A1 * | 11/2004 | Ben-Yehoshua ............... 426/532 |
| 2008/0311259 | A1 * | 12/2008 | Singh et al. ................... 426/330 |

OTHER PUBLICATIONS

International Search Report from co-pending Application PCT/EP2009/062170 dated Dec. 2, 2009, 12 pages.
Chou, T. C., "Theoretical Basis, Experimental Design, and Computerized Simulation of Synergism and Antagonism in Drug Combination Studies", Pharmacological Reviews 58 (3), 2006 pp. 621-681,124.

* cited by examiner

Primary Examiner — Tamra L Dicus

(57) ABSTRACT

Method of stabilizing drinks which is characterized in that
  A) the drink is admixed with limonene or limonene-containing formulations and
  B) subsequently dialkyl dicarbonate, in particular dimethyl dicarbonate, is added to the drink.

3 Claims, No Drawings

METHOD FOR PRESERVING DRINKS

The invention relates to a novel method of preserving drinks.

There is currently a trend towards natural foods, that is consumers prefer foods without artificial additives. In the case of drinks, preserving additives or methods are generally required for packaging. Currently there are a great number of possible stabilizing means, but these are in need of improvement in their effect. These frequently synthetic additives must also sometimes be declared, which is associated at least with a marketing disadvantage of such drinks.

Dialkyl dicarbonates are used in the drinks industry for cold sterilization of non-alcoholic carbonated or still fruit juice drinks, fruit juices, wines, non-alcoholic wines, ciders, ice teas and other drinks. This technology for drink stabilization has a number of advantages. The outstanding advantage here is due to the fact that flavour and colour are not affected, in contrast to hot packaging. Also, compared with persistent preservatives such as benzoate and/or benzoic acid or sorbate and/or sorbic acid there is the advantage, in particular, of the absence of any flavour impairment. Compared with cold aseptic packaging, the very significantly lower capital costs in equipment technology are particularly known as an advantage in the use of dialkyl dicarbonates.

The class of substances of dialkyl dicarbonates has the particular property of hydrolysing, in contact with appropriate (aqueous) drinks, into the derived alcohols and carbon dioxide. For this reason, an appropriately treated drink, at the time point of consumption, no longer has a preservative in the actual sense, i.e. the drinks, after they are opened, are susceptible to microbiological infection. It is therefore rather a technical aid, not an additive, for which reason in many countries the use of dialkyl dicarbonates, moreover, need not be declared on the label of the drink.

The object of the present invention is then to improve further the stabilizing properties during packaging of drinks. Surprisingly, a method has now been found using which it is possible to improve further the stabilizing effect of dialkyl dicarbonates.

A novel method has now been found for stabilizing drinks which is characterized in that
A) the drink is admixed with limonene or limonene-containing formulations and
B) subsequently dialkyl dicarbonate, in particular dimethyl dicarbonate, is added to the drink.

Limonene can be used, for example as D-limonene (R(+)-limonene), as L(−)-limonene or as a mixture of the two or as their racemate. D-limonene (R(+)-limonene is, for example, a component of citrus fruit peels. Although limonene-containing formulations have already been proposed for the microbiological stabilization of drinks (U.S. Pat. No. 7,258,883), these alone have only a very limited effect against many of the frequently occurring microorganisms which harm drinks and are therefore of only very limited use for preservation in the packaging operation. Compared with the prior art, the method has the following advantages:

A synergistic increase in action of the activities of the individual components against important microorganisms has been found.

The method results in total in an increase in the spectrum of activity, i.e. gaps in activity are unexpectedly closed.

The method has the advantage that the resultant stabilization of the drinks behaves in a beneficial manner with respect to time, i.e. short-time and long-time activity supplement each other.

The method in addition has the advantage that the drinks, after application of the method, no longer contain synthetic preservatives.

The sequence of addition has proved to be important in order to achieve the desired activity.

Limonene can be used in this method in various forms. Not only extracts from nature are suitable, but also synthetically obtained limonene. The use of limonene from citrus peel offers the advantage that the additional accompanying components of contained terpenes can likewise contribute an activity. Expediently, the limonene, however, is used as aqueous limonene emulsion. Co-solvents and/or emulsifiers which can be used are, preferably, all emulsifiers which are permitted for foods such as, for example, carrageenan, polysorbate 80, agar, pectin, lecithin, soya lecithin, Tween® 80, Tween® 60 or Tween® 20 and also water, aliphatic monoalcohols, in particular $C_1$-$C_6$-alcohols, such as, for example, ethanol, n-propanol or isopropanol, glycols, in particular ethylene glycol or diethylene glycol and also dimethyl sulphoxide (DMSO). Mixtures of these emulsifiers and/or solvents can also advantageously be used.

Preferably, limonene is used as a natural extract having a content of limonene greater than 85% by weight, preferably greater than 90%. This extract has a fraction of decanal and octanal of together preferably less than 5% by weight, in particular less than 1% by weight.

L(−)-limonene can also be used, wherein here, preferably, extracts of noble firs, or peppermint oils are used. Natural or synthetic racemic limonene can likewise be used.

The limonene emulsion preferably used is preferably aqueous and preferably has a limonene content of 2 to 30% by weight, particularly preferably 5 to 25% by weight.

The emulsifiers and/or co-solvents likewise preferably co-used are preferably co-used in an amount of from 0.05 to 15% by weight, in particular from 0.5 to 10% by weight, based on the emulsion. Preferably, as emulsifier, use is made of soya lecithin, carrageenan, polysorbate 80, agar or pectin, in particular soya lecithin.

As further additives optionally to be co-used, for example beeswax and also alkali metal hydroxides and alkaline earth metal hydroxides such as KOH, NaOH and CAOH come into consideration. Preferably, the further additives are used in amounts of less than 2% by weight based on the formulation, in particular on the aqueous emulsion. Beeswax is added preferably in an amount of 0.01 to 1% by weight.

The dialkyl dicarbonate used is preferably dimethyl dicarbonate and preferably has a purity of greater than 99.8%.

As drinks, in addition to green tea, black tea and also other tea varieties and tea-based drinks, mention may also be made of carbonated and non-carbonated non-alcoholic soft drinks, fruit juices, fruit nectars, wines, non-alcoholic drinks, ciders, iced teas, alcoholic mixed drinks, flavoured waters or sports drinks. The drinks can preferably also additionally be preserved with sorbic acid or sorbates. Preferred drinks contain sorbic acid or sorbate.

The addition of limonene or formulations of limonene to the drink preferably proceeds in the mixing tank during mixing of the finished drink, but addition can also be made to the drinks concentrate which is to be diluted. Generally, the limonene is added in amounts of 10 to 5000 ppm, preferably 50 to 2000 ppm, in particular 50 to 1000 ppm, particularly preferably 50 to 500 ppm. The temperatures in this case are from 0 to 30° C. Addition via metering pumps, as also used for the addition of flavourings, is likewise possible.

The addition of dialkyl dicarbonate, in particular DMDC, to the drink preferably proceeds at temperatures of 0 to 25° C., wherein amounts of 1 to 250 ppm, based on the drink, in particular 40 to 250 ppm, are preferred, and are added, in particular, using a metering pump, directly into the drink stream. A dosage proportional to the drink can be ensured in this case by a flow meter installed into the drink stream. The dialkyl dicarbonate is preferably added here, in particular in the course of 100 hours, preferably 10 hours, in particular in the course of 1 hour after the addition of limonene.

The method according to the invention is particularly preferably used against the following strains: *Saccharomyces* sp., *Lactobacillus* sp., *Acetobacter* sp., *Penicillium* sp., *Aspergillus* sp., *Leuconostoc* sp., *Zygosaccharomyces* sp., and others.

EXAMPLES

Example 1

The activity of the individual components DMDC and limonene (in a formulation) and the activity of mixtures of DMDC and limonene (in a formulation) was tested against *Saccharomyces cerevisiae*.

For this, an apple juice drink was inoculated with 375 cells of *Saccharomyces cerevisiae* per ml and the active ingredient concentrations reported in Table 1 were added. In the table, DMDC is dimethyl dicarbonate, added as such. LF is a formulation having 10% limonene (water 80.9 w/w %, R(+)-limonene from citrus peel 10.2%, ethanol 6.7%, soya lecithin 2.0%, potassium hydroxide 0.1%, beeswax 0.1%).

LF was added first and then DMDC. Subsequently thereto the mixtures were thoroughly shaken and incubated at 26° C. for one week. The cell count present was then determined. The results may be found in Table 1.

DMDC and 1500 ppm of LF. Therefrom is calculated a "combination index" (see Ting-Chao Chou, "Theoretical Basis, Experimental Design and Computerized Simulation of Synergism and Antagonism in Drug Combination Studies", *Pharmacological Reviews* 58 (3) 2006, 621-681) of:

$$CI = [c(\text{DMDC mixture})/c(\text{DMDC alone})] + [c(\text{LF mixture})/c(\text{LF alone})]$$

$$CI = 50/150 + 1500/5000 = 0.63 \text{(more exactly <0.63)}$$

The mixture is therefore synergistically active.

Example 2

The activity of DMDC against *Lactobacillus brevis* was compared with that of limonene. Whereas the activity of DMDC is generally directed in a broad manner against many microorganisms, here the spectrum of activity is supplemented very well with limonene.

Table 2 gives the results of the microbiological colony count determination. For this a sterilized drink matrix (apple juice/water 1:1) was inoculated with different cell inocula of *L. brevis* admixed with DMDC or limonene in the stated concentrations, the samples were shaken well and after 24 hours on suitable agar plates the respective cell counts present were determined (in each case in duplicate).

"Limonene emulsified" is a solution of synthetic R(+)-limonene (10% by weight) and soya lecithin (2% by weight)

TABLE 1

| Cell inoculum | 375 cells/ml, evaluation after one week | | | | |
|---|---|---|---|---|---|
| Concentration | Without LF | 1500 mg/l of LF | 2000 mg/l of LF | 2500 mg/l of LF | 5000 mg/l of LF |
| Without DMDC | +/+ | +/+ | +/+ | +/+ | +/+ |
| 10 ppm DMDC | +/+ | +/+ | +/+ | +/+ | n.d. |
| 25 ppm DMDC | +/+ | +/+ | +/244 | +/82 | n.d. |
| 50 ppm DMDC | +/+ | −/− | −/− | −/− | n.d. |
| 100 ppm DMDC | +/+ | −/− | −/− | −/− | n.d. |
| 150 ppm DMDC | 152/+ | −/− | −/− | −/− | n.d. |

Units: Colony-forming units per ml of drink sample examined + = >300 cells, − = no cells visible, n.d. = not determined
The experiments were each carried out in duplicate.

It may be seen that the mixture has a significantly improved activity than the individual components.

The efficacy, defined as freedom from cells, of DMDC alone is above 150 ppm. The efficacy of LF is above 5000 ppm. The efficacy of a suitable mixture is below 50 ppm of in water. Before use this mixture is freshly emulsified by means of mechanical shearing.

"Limonene formulated" is a mixture of water 80.9 w/w %, R(+)-limonene from citrus peel 10.2%, ethanol 6.7%, soya lecithin 2.0%, potassium hydroxide 0.1%, and beeswax 0.1%, which was emulsified by suitable shear forces.

TABLE 2

| Test cell | *Lactobacillus brevis*, cell count determination after 24 hours | | |
|---|---|---|---|
| Cell Inoculum approximately | 100 cells/ml | 1000 cells/ml | 10 000 cells/ml |
| Active ingredient Concentrations | | | |
| No active ingredient | 88/91 | +/+ | +/+ |
| DMDC | 54/75 | +/+ | +/+ |
| Limonene emulsified 500 ppm | −/1 | 1/5 | 33/44 |
| Limonene formulated 500 ppm | 3/1 | 8/13 | 106/111 |

Units: Colony forming units per ml of drink sample studied, + = >300 cells, − = no cells visible Example 3

An orange juice drink (approximately 20% orange juice, approximately 8 Brix) without sorbate additions was first admixed with 500 ppm of an emulsified mixture of water 80.9 w/w %, R(+)-limonene from citrus peel 10.2%, ethanol 6.7% and soya lecithin 2.0% and subsequently (during the course of 5 hours) admixed with 200 ppm of DMDC. Thereafter the drink was packaged directly on a drinks bottling line (10 000 l/h) into 0.5 l PET bottles.

In this case the limonene-containing mixture was added during final mixing of the drink, whereas for metering DMDC, an electromagnetic metering pump connected upstream of the filler was used.

As comparative experiment, the same drink was packaged non-preserved, or packaged treated only with DMDC or treated only with limonene.

The samples were thereafter regularly inspected visually and organoleptically.

Results: The microbiological keeping times of the samples are listed.
(a) Preserved with DMDC and limonene: >100 days
(b) Non-preserved: approximately 2 days
(c) Preserved with DMDC: approximately 20 days
(d) Preserved with limonene: approximately 2 days Example 4

An orange juice drink (approximately 20% orange juice, approximately 8 Brix) containing sorbic acid as potassium sorbate (equivalent to 100 ppm of sorbic acid) was first admixed with 500 ppm of an emulsified mixture of water 80.9 w/w %, R(+)-limonene from citrus peel 10.2%, ethanol 6.7%, soya lecithin 2.0%, potassium hydroxide 0.1% and beeswax 0.1% and subsequently (in the course of 5 hours) admixed with 200 ppm of DMDC. Thereafter the drink was packaged directly on a drinks bottling line (10 000 l/h) into 0.5 l PET bottles.

In this case the limonene-containing mixture was added during final mixing of the drink, whereas for metering DMDC, an electromagnetic metering pump connected upstream of the filler was used.

As comparative experiment, the same drink was packaged non-preserved, or packaged treated only with DMDC or only with limonene.

The samples were thereafter regularly inspected visually and organoleptically.

Results: The microbiological keeping times of the samples are listed.
(e) Preserved with sorbic acid, DMDC and limonene: >100 days
(f) Only with sorbic acid: approximately 6 days
(g) Preserved with sorbic acid and DMDC: >100 days
(h) Preserved with sorbic acid and limonene: approximately 5 days

What is claimed is:

1. A method of stabilizing a drink, the method comprising:
admixing the drink with 10 to 5000 ppm limonene or limonene-containing formulations; and
subsequently adding dimethyl dicarbonate.

2. The method according to claim 1, wherein the limonene-containing formulation comprises beeswax.

3. The method according to claim 1, wherein said drink comprises sorbic acid, and whereby said drink is stabilized against microbial infection.

* * * * *